(12) United States Patent  (10) Patent No.: US 8,777,498 B2
Sakamoto et al.  (45) Date of Patent: Jul. 15, 2014

| (54) | METHOD FOR MANUFACTURING OPTICAL MODULE |
|---|---|
| (75) | Inventors: Akira Sakamoto, Sakura (JP); Yasushi Harano, Sakura (JP); Daisuke Awaji, Sakura (JP) |
| (73) | Assignee: Fujikura Ltd., Tokyo (JP) |
| ( * ) | Notice: Subject to any disclaimer, the term of this patent is extended or adjusted under 35 U.S.C. 154(b) by 361 days. |
| (21) | Appl. No.: 13/107,529 |
| (22) | Filed: May 13, 2011 |
| (65) | Prior Publication Data |
|  | US 2011/0299817 A1    Dec. 8, 2011 |
| (30) | Foreign Application Priority Data |
|  | Jun. 3, 2010   (JP) ................................ 2010-127674 |
| (51) | Int. Cl. *G02B 6/36* (2006.01) |
| (52) | U.S. Cl. USPC ............................................................ 385/94 |
| (58) | Field of Classification Search USPC ............................................................. 385/94 See application file for complete search history. |
| (56) | References Cited |

U.S. PATENT DOCUMENTS

| 1,531,730 | A |  | 3/1925 | Bundy |
|---|---|---|---|---|
| 2,717,840 | A | * | 9/1955 | Bosch ........................... 427/299 |
| 6,318,910 | B1 | * | 11/2001 | Higashikawa .................. 385/94 |
| 6,997,621 | B2 |  | 2/2006 | Saitou et al. |
| 8,215,848 | B1 | * | 7/2012 | Chan et al. ...................... 385/91 |
| 2001/0026664 | A1 |  | 10/2001 | Tanaka et al. |
| 2004/0264889 | A1 |  | 12/2004 | Lake |

FOREIGN PATENT DOCUMENTS

| JP | 62-065003 | A | 3/1987 |
|---|---|---|---|
| JP | 02-064608 | A | 3/1990 |
| JP | 02-072699 | A | 3/1990 |
| JP | 05152049 | A | 6/1993 |
| JP | 08-179170 | A | 7/1996 |
| JP | 2005-165200 | A | 6/2005 |
| JP | 2009103744 | A | 5/2009 |
| JP | 2009-248111 | A | 10/2009 |

OTHER PUBLICATIONS

Office Action issued by the United States Patent Office; U.S. Appl. No. 13/073,433; issued Sep. 6, 2013.
Japanese Office Action; Application No. 2010-075379; Jun. 4, 2013.
Japanese Office Action; Application No. 2010-127674; Jun. 4, 2013.
Final Office Action issued by the United States Patent Office, U.S. Appl. No. 13/073,433; issued Mar. 27, 2014.

* cited by examiner

*Primary Examiner* — Charlie Peng
*Assistant Examiner* — Erin Chiem
(74) *Attorney, Agent, or Firm* — Sughrue Mion, PLLC

(57) ABSTRACT

A method of the present invention is a method for manufacturing an optical module (10) including an optical fiber (3) and an optical fiber insertion pipe (2) into which the optical fiber (3) is inserted, and includes a sealing step in which the optical fiber insertion pipe (2) is hermetically sealed. The sealing step includes a contact step, a heating step, and a feeding step. In the contact step, a heat conductor member (5) is provided along and in contact with a side surface of the optical fiber insertion pipe (2), the heat conductor member having a heat conductivity greater than that of an environmental atmosphere of the sealing step and having a heat generating property of generating heat by induction heating, which heat generating property of the heat conductor member is inferior to that of the optical fiber insertion pipe (2) in terms of heat generation amount. In the heating step, the optical fiber insertion pipe (2) thus provided with the heat conductor member (5) is heated by induction heating. In the feeding step, a solder (6) is fed to a feed hole (4) provided in the optical fiber insertion pipe (2). The present invention provides the method in which workability of hermetic sealing is thus improved.

18 Claims, 4 Drawing Sheets

METHOD FOR MANUFACTURING OPTICAL MODULE

This Nonprovisional application claims priority under 35 U.S.C. §119(a) on Patent Application No. 2010-127674 filed in Japan on Jun. 3, 2010, the entire contents of which are hereby incorporated by reference.

TECHNICAL FIELD

The present invention relates to a method for manufacturing an optical module including an optical fiber.

BACKGROUND ART

Generally, an optical module has a structure described as follows. Members such as (i) a light-emitting device such as an LD, an LED or the like, (ii) a light receiving device such as a photodiode or the like, and the like are housed in a housing. An optical fiber optically coupled to the light-emitting device and/or the light receiving device extends to the outside of the housing via an optical fiber insertion pipe.

Regarding such an optical module, Patent Literature 1 discloses a method for fixing an optical fiber extending to the outside of the optical module. In the method of Patent Literature 1, an optical fiber insertion pipe is prepared. A side surface of the optical fiber insertion pipe has a hole. Then, an end of the optical fiber is inserted into an opening of an end of the optical fiber insertion pipe. After this, the hole is soldered by heating a solder chip by using laser welding or high frequency induction heating. This fixes the optical fiber inside the optical fiber insertion pipe 2. The method of Patent Literature 1 is more advantageous from a conventional adhesive fixing in terms that an effect of the fixing lasts over years and the fixing can be finished within a short time. As such the method is suitable for mass production of the optical module.

Light-emitting devices and light receiving devices are so vulnerable to moisture, a dust, and the like that enters from outside. When contaminated with the moisture, dust, or the like, they may suffer malfunctioning or serious deterioration in reliability. Therefore, in manufacturing of optical module, it is necessary to hermetically sealing the optical modules so as to completely prevent the light-emitting devices from being exposed to the outside.

CITATION LIST

Patent Literature 1

Japanese Patent Application Publication, Tokukaihei, No. 2-64608 A (Publication Date: Mar. 5, 1990)

SUMMARY OF INVENTION

Technical Problem

The inventors of the present invention studied, in effort of improving the manufacturing of optical modules, how to improve workability of a sealing step of hermetically sealing the optical modules. Then, the inventors of the present invention noticed that a solder feeding method of Patent Literature 1 was useful for improving the workability of the sealing step.

As such, the inventors of the present invention diligently studied how to hermetically seal an optical fiber insertion pipe by heating the optical fiber insertion pipe and soldering an optical fiber in the optical fiber insertion pipe with a solder supplied to a hole (hereinafter referred to as a feed hole) provided in the optical fiber insertion pipe. As a result of the diligent study, the inventors of the present invention found that a method which simply heats the optical fiber insertion pipe has the following limitation concerning workability of the hermetic sealing.

That is, in a case where the optical fiber insertion pipe is directly heated by using a heater, it takes a long time before the optical fiber insertion pipe is heated to a solder melting temperature. This adversely increases a working time. Further, such a long working time will produce a gradient of a temperature over the optical fiber insertion pipe in a lengthwise direction thereof. As such, it will be difficult that the solder thus melted spreads, by wetting, in the optical fiber insertion pipe uniformly with respect to the lengthwise direction. Furthermore, it is difficult to prevent an increase in the temperature of the part where the light-emitting device is mounted.

On the other hand, in a case of heating the optical fiber insertion pipe by high frequency induction heating, it is possible to heat the optical fiber insertion pipe to a solder melting temperature within a short time. As such, it is possible to prevent a temperature of a part, onto which the light-emitting device is mounted, from being increased. However, the heating by the induction heating has a limitation that it is difficult to minutely control distribution of a generated heat. Thus, there is a case that the solder melted fails to uniformly spread by wetting inside the optical fiber insertion pipe.

A temperature of an outside of the optical fiber insertion pipe is same as or higher than a temperature of an inside of the optical fiber insertion pipe, irrespective of whether the optical fiber insertion pipe is heated by using the heater or heated by the induction heating. This poses a risk that the solder is leaked outside the optical fiber insertion pipe, and it is therefore difficult to selectively fill the inside of the optical fiber insertion pipe with the solder.

The present invention is made in view of the problem, and an object of the present invention is to provide a method for manufacturing an optical module, which method including carrying out hermetic sealing whose workability is improved.

Solution to Problem

In order to attain the object, a method of the present invention for manufacturing an optical module includes a sealing step in which the optical fiber insertion pipe is hermetically sealed, the sealing step including: a contact step in which a heat conductor member is provided along and in contact with a side surface of the optical fiber insertion pipe, the heat conductor member having a heat conductivity greater than that of an environmental atmosphere of the sealing step and having a heat generating property of generating heat by induction heating, which heat generating property of the heat conductor member is inferior to that of the optical fiber insertion pipe in terms of heat generation amount; a heating step in which the optical fiber insertion pipe, to which the heat conductor member is thus provided in the contact step, is heated by induction heating, and a feeding step in which a solder is fed to a feed hole provided in the optical fiber insertion pipe.

In the heating step, the optical fiber insertion pipe is heated to a solder melting temperature by the induction heating. As such, the solder fed to the feed hole is melted by a heat conducting from the optical fiber insertion pipe and fed to the inside of the optical fiber insertion pipe through the feed hole. After this, while it is kept melted by the heat conducting from the optical fiber insertion pipe, the solder thus melted and fed to the inside of the optical fiber insertion pipe fills, by wetting, a space between an inner wall of the optical fiber insertion pipe and the optical fiber.

In the contact step, the heat conductor member is provided along and in contact with the side surface of the optical fiber insertion pipe. This allows a suitable control of the temperature distribution over the optical fiber insertion pipe. This allows the solder thus melted to suitably spread by wetting.

That is, when subjected to the induction heating, a temperature of the heat conductor member is lower than a temperature of the optical fiber insertion pipe. Also, temperature distribution due to the induction heating is less biased in the heat conductor member than in the optical fiber insertion pipe. In accordance with the temperature distribution, the heat conductor member draws heat from a high temperature part of the optical fiber insertion pipe and transfers the heat to a low temperature part of the same in a region where the heat conductor member and the side surface of the optical fiber insertion pipe are in contact with each other. This can uniformize the temperature of the region. As such, the solder melted can uniformly spread, by wetting, inside the optical fiber insertion pipe. This makes it possible to carry out suitable hermetic sealing of the optical fiber insertion pipe.

In a case of providing the heat conductor member along and in contact with an outer edge part of the feed hole via which the solder is fed to the inside of the optical fiber insertion pipe from the outside, it is possible to control a temperature in the outer edge part of the feed hole so that a temperature of the outer part of the optical fiber insertion pipe is lower than a temperature of the inner part of the optical fiber insertion pipe. This can prevent the solder from leaking outside, thereby making it possible to selectively fill the inside of the optical fiber insertion pipe with the solder.

In the method of the present invention, therefore, the temperature distribution over the optical fiber insertion is suitable. As such, workability of the hermetic sealing by solder filling can be improved. With the method of the present invention, therefore, it is possible to efficiently manufacture the optical module.

An optical module of the present invention includes an optical fiber and an optical fiber insertion pipe into which the optical fiber is inserted, the optical fiber insertion pipe being hermetically sealed by a solder, and a heat conductor member provided along and in contact with a side surface of the optical fiber insertion pipe, the heat conductor member having a heat conductivity greater than that of an environmental atmosphere of the sealing step and having a heat generating property of generating heat by induction heating, which heat generating property of the heat conductor member is inferior to that of the optical fiber insertion pipe in terms of heat generation amount.

Since the heat conductor member is thus provided, it is possible that temperature distribution over the optical fiber insertion pipe is suitable while the hermetic sealing of the optical fiber insertion pipe with the solder is being carried out. Since this improves the workability of the hermetic sealing by the solder filling, it is possible to improve manufacturing of the optical module.

The scope of the present invention also encompasses a method of hermetically sealing an optical fiber insertion pipe into which an optical fiber is inserted, the method including the contact step, the feeding step, and the heating step each described above.

Advantageous Effects of Invention

A method of the present invention is a method for manufacturing an optical module including an optical fiber and an optical fiber insertion pipe in which the optical fiber is inserted, the method including a sealing step in which the optical fiber insertion pipe is hermetically sealed, the sealing step including: a contact step in which a heat conductor member is provided along and in contact with a side surface of the optical fiber insertion pipe, the heat conductor member having a heat conductivity greater than that of an environmental atmosphere of the sealing step and having a heat generating property of generating heat by induction heating, which heat generating property of the heat conductor member is inferior to that of the optical fiber insertion pipe in terms of heat generation amount; a heating step in which the optical fiber insertion pipe, to which the heat conductor member is thus provided in the contact step, is heated by induction heating; and a feeding step in which a solder is fed to an inside of the optical fiber insertion pipe via a feed hole provided in the optical fiber insertion pipe. In the method of the present invention, temperature distribution over the optical fiber insertion pipe can be suitable. This can improve workability of the hermetic sealing by solder filling. With the method of the present invention, it is therefore possible to efficiently manufacture the optical module.

DESCRIPTION OF EMBODIMENTS

One embodiment of the present invention is described in detail below.

[As to Optical Module 10]

Figure 1:
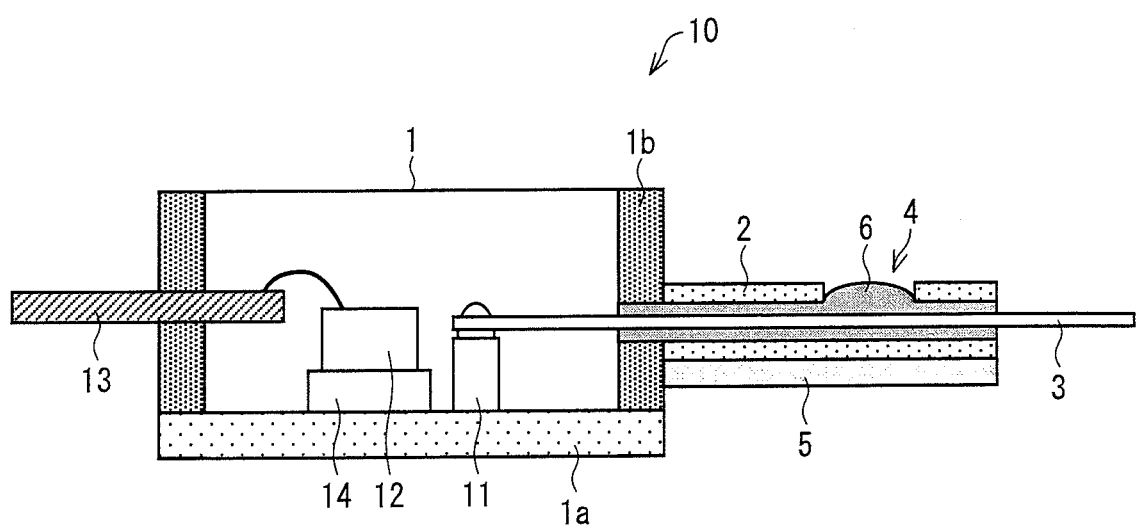
FIG. 1 is a cross sectional view showing an optical module subjected to a sealing step of a method of one embodiment of the present invention for manufacturing an optical module.

With reference to FIG. 1, the following description discusses an optical module 10 to be treated in a sealing step of a method of the present embodiment for manufacturing an optical module. FIG. 1 is a cross sectional view showing the optical module 10.

As shown in FIG. 1, the optical module 10 includes a light-emitting device 12, a housing 1, an optical fiber insertion pipe 2, and an optical fiber 3.

The housing 1 is an optical device package. The housing 1 has such a function that the light-emitting device can be housed and fixed inside the housing 1. The housing 1 has a bottom plate 1a and a side surface 1b. The light-emitting device 12 is fixed above the bottom plate 1a.

The optical fiber insertion pipe 2 is a pipe having a tubular shape. The optical fiber insertion pipe 2 is provided to the side surface 1b of the housing 1 so as to extend from the side surface 1b of the housing 1 in parallel with a direction in which the bottom plate 1a extends. One end of the optical fiber insertion pipe 2 is opened inside the housing 1, and the other end of the optical fiber insertion pipe 2 is opened outside the housing 1. It is preferable that the optical fiber insertion pipe 2 is made from a material efficiently heatable by high frequency induction heating (which is later described). For example, the optical fiber insertion pipe 2 can be made from iron or an alloy containing iron such as kovar, stainless, or the like. The optical fiber insertion pipe 2 has a feed hole 4 via which a solder 6 is fed. The following description discusses a case that a side surface of the optical fiber insertion pipe 2 has the feed hole 4. However, the present embodiment is not limited to this. Instead of the side surface of the optical fiber insertion pipe 2, the other end of the optical fiber insertion pipe 2 may be used as the feed hole 4. In this case, the solder 6 is fed via the same opening via which the optical fiber 3 is inserted into the optical fiber insertion pipe 2.

The optical fiber 3 is inserted into the housing 1 via the optical fiber insertion pipe 2. The optical fiber 3 and the light-emitting device 12 are optically coupled to each other by aligning their respective optical axes to each other. The optical fiber 3 may be held in the housing 1 by a mount 11. An optical fiber whose quartz part is exposed can be suitably used as the optical fiber 3.

The light-emitting device 12 can be, for example, an LED chip or the like. The light-emitting device 12 may be connected, via a line, to a lead 13 inserted into the housing from the outside. The light-emitting device 12 may be placed on a support plate 14 provided for supporting the light-emitting device 12. If the light-emitting device 12 is an LD chip, there is a case that the support plate 14 is called an LD sub mount.

A heat sink (which is not shown in the drawing) is provided to a lower part of the bottom plate 1a so as to prevent an increase in a temperature of the light-emitting device 12. It is preferable that the bottom plate 1a is made from a material having a high heat conductivity. For example, the bottom plate 1a can be made from copper or the like. The side surface 1b of the housing 1 may be made from any of the above described materials each of which is heatable by the high frequency induction heating.

Shapes, structures, sizes, and the like of the constituents described so far are not particularly limited, but can be appropriately determined as usage and/or in accordance with a use purpose of the optical module 10.

[Manufacturing Method]

A method of the present embodiment for manufacturing an optical module should include a sealing step in which the optical fiber insertion pipe 2 of the optical module 10 is hermetically sealed, the sealing step including: a contact step in which the heat conductor member 5 is provided along and in contact with the side surface of the optical fiber insertion pipe 2, the heat conductor member 5 (i) whose heat conductivity is greater than a heat conductivity of an environmental atmosphere of the sealing step and (ii) whose heat generation amount obtained when heated by induction heating is greater than a heat generation amount of the optical fiber insertion pipe 2 which is obtained when heated by the induction heating; a heating step in which the optical fiber insertion pipe 2 thus provided with the heat conductor member 5 in the contact step is heated by the induction heating; and a feeding step in which the solder 6 is fed to the feeding hole 4 provided in the optical fiber insertion pipe 2. It is preferable that the environmental atmosphere of the sealing step is, for example, (i) an inactive gas atmosphere such as nitride, argon, or the like, (ii) a reductive atmosphere such as hydrogen, (iii) a gas atmosphere of a mixture of an inactive gas and hydrogen or the like, or the like atmosphere. This can prevent oxidation of the solder 6. In the feeding step, the solder 6 is melted by a heat conducting from the optical fiber insertion pipe 2 having been heated, and is then fed to the inside of the optical fiber insertion pipe 2 via the feed hole 4. This hermetically seals the optical fiber insertion pipe 2.

With reference to FIG. 1, the following description discusses the contact step, the heating step, and the feeding step each included in the sealing step.

[Contact Step]

In the contact step, the heat conductor member 5 is provided along and in contact with the side surface of the optical fiber insertion pipe 2. In the present Description, "the heat conductor member 5 is provided along and in contact with the side surface of the optical fiber insertion pipe 2" indicates that (i) the heat conductor member 5 is provided along the side surface of the optical fiber insertion pipe 2 and (ii) the heat conductor member 5 and the optical fiber insertion pipe 2 are in contact with each other. It is preferable that the contact between the heat conductor member 5 and the optical fiber insertion pipe 2 is maintained at least during the heating step and the feeding step (which are later described). As later described, the heat conductor member 5 may be fixed, by its spring characteristic, to the side surface of the optical fiber insertion pipe 2 or may be supported by any supporter so as to be provided along and in contact with the side surface of the optical fiber insertion pipe 2.

Figure 2:
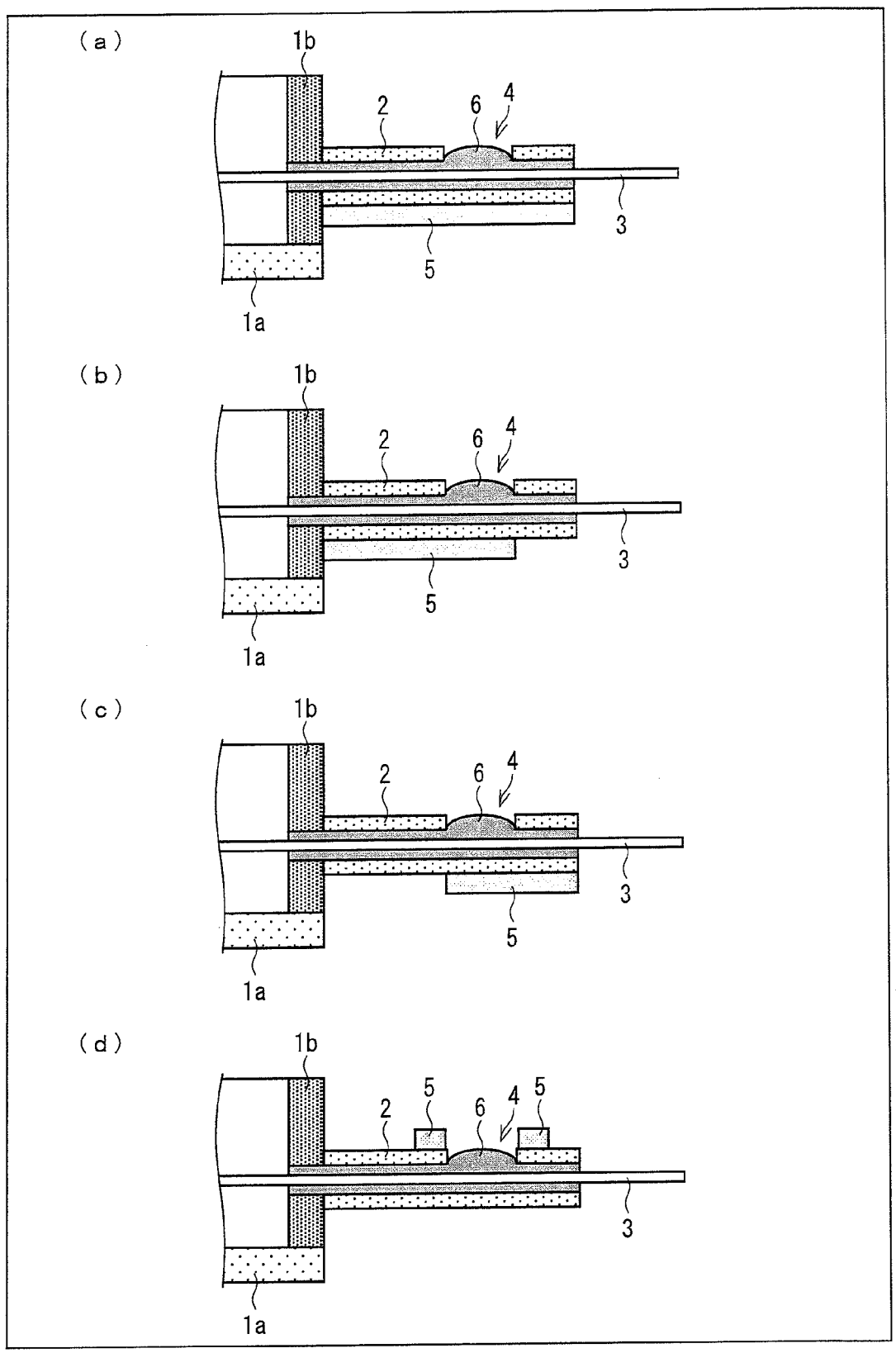
FIG. 2 Each of (a) through (d) of FIG. 2 is a partial enlarged view showing a variation of a region where an optical fiber insertion pipe and a heat conductor member are in contact with each other, which optical fiber insertion pipe and heat conductor member are subjected to the sealing step shown in FIG. 1.

The contact between the heat conductor member 5 and the side surface of the optical fiber insertion pipe 2 is not limited, provided that it is a heat contact, i.e., it allows heat conduction between the heat conductor member 5 and the side surface of the optical fiber insertion pipe 2. (a) through (d) of FIG. 2 are partial enlarged views showing respective variations of a part where the heat conductor member 5 and the side surface of the optical fiber insertion pipe 2 are in contact with each other. It is preferable that the part, where the heat conductor member 5 and the side surface of the optical fiber insertion pipe 2 are in contact with each other, extends over an entire length of a lengthwise direction of the side surface of the optical fiber insertion pipe 2 (see (a) of FIG. 2). However, the present embodiment is not limited to this.

Because the hermetic sealing of the optical fiber insertion pipe 2 is mainly carried out by (i) melting the solder 6 near the feed hole 4 and (ii) letting the solder 6 thus melted spread, by wetting, inside the optical fiber insertion pipe 2 in a direction extending toward the housing 1, the hermetic sealing may be appropriately carried out by employing the heat conductor member 5 having a configuration as shown in (b) of FIG. 2, for example. By employing the heat conductor member 5 as shown in (b) of FIG. 2, it is possible in the feeding step to let the wire solder 6 suitably spread, by wetting, in a region extending between the near the feed hole 4 and the housing 1. In (b) of FIG. 2, the heat conductor member 5 is provided along and in contact with the side surface of the optical fiber insertion pipe 2 and extends from the near the feed hole 4 to the housing 1. Since the solder 6 thus suitably spreads in the region, it is possible that the hermetic sealing of the optical fiber insertion pipe 2 is successfully carried out.

The housing 1 draws no heat from that end part of the optical fiber insertion pipe 2 which is farther from the housing 1. As such, it is easy that a temperature of this end part of the optical fiber insertion pipe 2 is increased. However, by employing the heat conductor member 5 having a configuration as shown in (c) of FIG. 2, it is possible in the heating step (which is later described) to prevent an excess increase in the temperature of the end part of the optical fiber insertion pipe 2. In (c) of FIG. 2, the heat conductor member 5 is provided along and in contact with the side surface of the optical fiber insertion pipe 2 and extends from near the feed hole 4 to the end part of the optical fiber insertion pipe 2.

In a case of employing the heat conductor member 5 that has a configuration as shown in (d) of FIG. 2, it is possible to carry out such heat drawing that a heat is drawn, by the heat conductor member 5, from a surface of the optical fiber insertion pipe 2. The configuration shown in (d) of FIG. 2 is such that the heat conductor member 5 is provided along and in contact with an outer edge part of the feed hole 4 in the optical fiber insertion pipe 2. This heat drawing decreases a temperature of an outer part of the optical fiber insertion pipe 2 to be lower than a temperature of an inside of the optical fiber insertion pipe 2 in the outer edge part of the feed hole 4. As such, in the feed hole 4, a fluidity of the solder 6 is decreased as the solder 6 is farther from the inside of the optical fiber insertion pipe 2 toward the outside of the optical fiber insertion pipe 2. This makes it possible in the feeding step to prevent the solder 6 from being leaked outside from the feed hole 4, thereby making it possible to selectively fill the inside of the optical fiber insertion pipe 2 with the solder 6.

Two or more of the contact conditions shown in (a) through (d) of FIG. 2 may be used in combination. The shape of the heat conductor member 5 is not limited to a particular one. For example, the shape of the heat conductor member 5 may be a plate-like shape. It is more preferable that the heat conductor member 5 has a shape which extends along the side surface of the optical fiber insertion pipe 2. For example, the heat conductor member 5 may have a tube-like shape or a partially tube-like shape whose cross section has a "C"-like shape. Other variations of the shape of the heat conductor member 5 are later described.

It is preferable that the heat conductor member 5 is thicker in thickness, since the thicker the thickness of the heat conductor member 5 is, the greater a temperature distribution uniformizing effect is. It is satisfactory if the thickness of the heat conductor member is approximately 0.1 mm to 2 mm.

It is preferable that the heat conductor member 5 is made from a material having a heat conductivity greater than that of an environmental atmosphere of the sealing step and having a heat generating property of generating heat by induction heating, which heat generating property of the heat conductor member is inferior to that of the optical fiber insertion pipe 2 in terms of heat generation amount. Thus, the heat conductor member 5 can be generally made from a material which has a greater heat conductivity and which is difficult to heat by the induction heating. The heat conductor member 5 may be made from (i) one or more metals selected from the group consisting of copper and aluminum, (ii) an alloy, such as a copper alloy, an aluminum alloy, or the like, which contains the one or more metals selected from the group consisting of copper and aluminum, or (iii) ceramics. Examples of ceramics encompass aluminum nitride, aluminum oxide [alumina], zirconium dioxide [zirconia], glass, and the like. Ceramics generates absolutely no heat when heated by the induction heating. As such, even in a case of employing the heat conductor member 5 which is made from any of zirconia and glass whose heat conductivities are not so high, it is still possible to bring about a sufficient heat drawing effect, as compared to a case in which no heat conductor member 5 is employed. Materials such as rubber and the like are not heatable by the induction heating. However, none of them can be employed as the material of the heat conductor member 5, because they are not heat resistant against a solder melting temperature.

In the contact step, the heat conductor member 5 is provided in the optical module 10. The heat conductor member 5 thus provided adjusts temperature distribution over the optical fiber insertion pipe 2 during the heating step.

[Heating Step]

After the contact step, the heating step heats the optical fiber insertion pipe 2, the side surface of the optical fiber insertion pipe 2 and the heat conductor member 5 being provided in contact with each other.

It is preferable that the optical fiber insertion pipe 2 is heated by using a high frequency induction heating apparatus. The high frequency induction heating apparatus basically includes an AC power source and a work coil. The high frequency induction heating apparatus heats a workpiece material by inducing an eddy current within the workpiece material. By employing the high frequency induction heating, it is possible to heat the workpiece (which is the optical fiber insertion pipe 2 in the present Description) with accuracy in a short time.

The heat conductor member 5 is made from a material which is more difficult, than the optical fiber insertion pipe 2, to heat by the induction heating. The heat conductor member 5 is preferably not heatable by the induction heating. As such, when subjected to the induction heating, a temperature of the heat conductor member 5 is lower than a temperature of the optical fiber insertion pipe 2. Also, the temperature of the heat conduct member 5 due to the induction heating is more uniform. In a region where the heat conductor member 5 and the side surface of the optical fiber insertion pipe 2 are in contact with each other, the heat conductor member 5 draws heat from a high temperature part and transfers the heat to a low temperature part, in accordance with the temperature distribution. This can uniformize the temperature of the region. As such, it is possible in the feeding step to let the solder 6 thus melted spread, by wetting, uniformly inside the optical fiber insertion pipe 2 in the region. This makes it possible to carry out suitable hermetic sealing of the optical fiber insertion pipe 2.

In the heating step, it is preferable to locally heat that end part of the optical fiber insertion pipe 2 which is closer to the housing 1. A reason for this is described as follows. Because the light-emitting device 12 is vulnerable to heat, it should be avoided that the light-emitting device 12 is heated to 150° C. or higher in the sealing step. In order for the light-emitting device 12 not to be heated to 150° C. or higher, the bottom plate 1a of the housing 1 is normally made from a material having a greater heat conductivity and is provided in contact with a heat release material such as a heat sink. This allows the bottom plate 1a of the housing 1 to draw heat from that end part of the optical fiber insertion pipe 2 which is closer to the bottom plate 1a of the housing 1. In this case, by intensively heating that end part of the optical fiber insertion pipe 2 which is closer to the housing 1, it is possible to prevent the heat drawing from having an adverse influence. This can further uniformize the temperature in the entire optical fiber insertion pipe 2.

Local heating of the optical fiber insertion pipe 2 can be carried out by using, for example, (i) an induction heating coil designed for local heating, (ii) a ferrite core, or the like.

[Feeding Step]

In the feeding step, the solder 6 is fed to the feed hole in the optical fiber insertion pipe 2 which has been subjected to the heating during the heating step.

The solder 6 can be a normal and inexpensive wire solder or the like. The solder 6 may be cut to such a length that an amount of the solder 6 required to carry out single hermetic sealing or multiple hermetic sealings is obtained.

A tool may or may not be used in the feeding of the solder 6 so as to move the solder 6 to above the feed hole 4. The solder 6 which has moved closer to the feed hole 4 is melted by a heat conducting from the optical fiber insertion pipe 2 heated during the heating step. Then, the solder 6 which has reached the feed hole 4 is fed through the feed hole 4 to an inside of the optical fiber insertion pipe 2, while being melted. Thereafter, the solder 6 thus being melted spreads inside the optical fiber insertion pipe 2 by wetting so as to fill a space between an inner wall of the optical fiber insertion pipe 2 and the optical fiber 3. A fluidity of the solder 6 thus being melted tends to be high in a region where a temperature is high and low in a region where temperature is low.

As described above, a temperature of a region where the heat conductor member 5 and the side surface of the optical fiber insertion pipe 2 are in contact with each other is uniformized. This allows the solder 6 thus melted to uniformly spread, by wetting, inside this region of the optical fiber insertion pipe 2. It is therefore possible to carry out hermetic sealing of the optical fiber insertion pipe 2 at a good workability level.

The optical module 10 is manufactured by thus carrying out the hermetic sealing. The heat conductor member 5 may or may not be removed from the side surface of the optical fiber insertion pipe 2 after the hermetic sealing is finished. In a case where the heat conductor member 5 is not removed from it, it can be said that the optical module 10 includes the heat conductor member 5.

[Variations in Locations of Feed Hole 4 and Heat Conductor Member 5]

In the method of the present invention, where to locate the feed hole 4 and the heat conductor member 5 is not limited to the location early described. The following description discusses variations of the location of each of the feed hole 4 and the heat conductor member 5.

Figure 3:
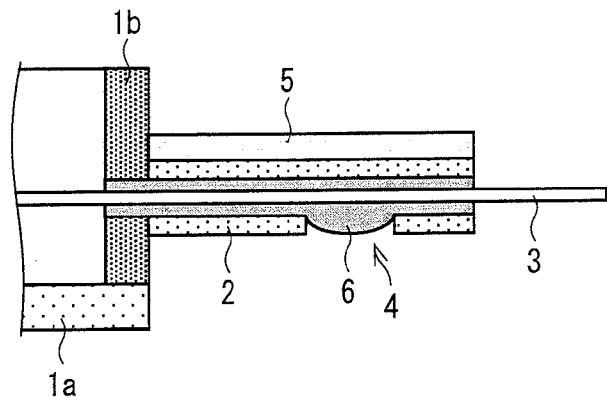
FIG. 3 is a cross sectional view showing a variation of each of a feed hole and the heat conductor member which are subjected to the sealing step shown in FIG. 1.

FIG. 3 is a cross sectional view showing that (i) the side surface of the optical fiber insertion pipe 2 has the feed hole 4 on a downward side (which is a side closer to the bottom plate 1a), and (ii) the heat conductor member 5 is provided along and in contact with an upward side (which is a side opposite to the side closer to the bottom plat 1a) of the side surface of the optical fiber insertion pipe 2. As shown in FIG. 3, the downward side of the side surface of the optical fiber insertion pipe 2 can have the feed hole 4, which downward side is provided lower with respect to a vertical direction of the side surface of the optical fiber insertion pipe 2.

The downward side of the side surface of the optical fiber insertion pipe 2 is closer to the bottom plate 1a, and the upward side of the side surface of the optical fiber insertion pipe 2a is farther from the bottom plate 1a. As such, with the configuration shown in FIG. 2, it is possible in the heating step that a temperature of that end of the optical fiber insertion pipe 2, which is closer to the housing 1, is uniform with respect to a vertical direction of the optical fiber insertion pipe 2.

That is, a heat is drawn, by the bottom plate 1a, from that side (the downward side) of the side surface of the optical fiber insertion pipe 2 which is closer to the bottom plate 1a. The heat conductor member 5 is provided along and in contact with that side (the upward side) of the side surface of the optical fiber insertion pipe 2 which is opposite to the side closer to the bottom plate 1a. This allows heat conduction from the upward side of the side surface of the optical fiber insertion pipe 2. This can decrease a difference between a temperature of the downward side of the side surface of the optical fiber insertion pipe 2 and a temperature of the upward side of the side surface of the optical fiber insertion pipe 2.

This allows the solder 6 to further uniformly spread by wetting inside that end part of the optical fiber insertion pipe 2 which is closer to the housing 1.

Here, whether the feeding step is finished or not can be determined, for example, by visual inspection to check, from the inside of the housing 1, whether the solder 6 reaches that end part of the optical fiber insertion pipe 2 which is closer to the housing 1 or not. In a case where the solder 6 further uniformly spreads, by wetting, inside that end part of the optical fiber insertion pipe 2 which is closer to the housing 1, as described above, it is possible to visually check, with accuracy, that the solder 6 reaches this end of the optical fiber insertion pipe 2. Thus, it is preferable that the solder 6 further uniformly spreads, by wetting, inside this end part of the optical fiber insertion pipe 2.

[Variations in Shape of Heat Conductor Member 5]

Figure 4:
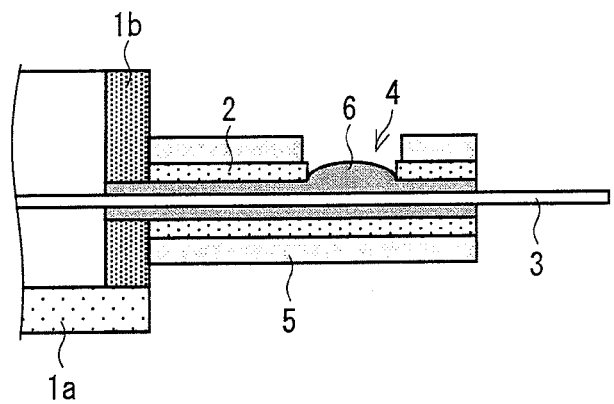
FIG. 4 is a cross sectional view showing a variation of the heat conductor member subjected to the sealing step shown in FIG. 1.
Figure 5:
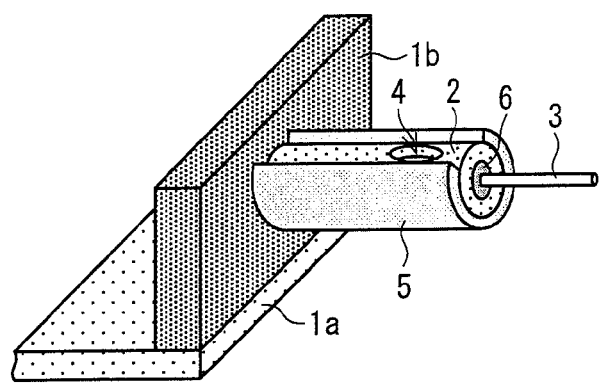
FIG. 5 is a perspective sectional view showing another variation of the heat conductor member subjected to the sealing step shown in FIG. 1.
Figure 6:
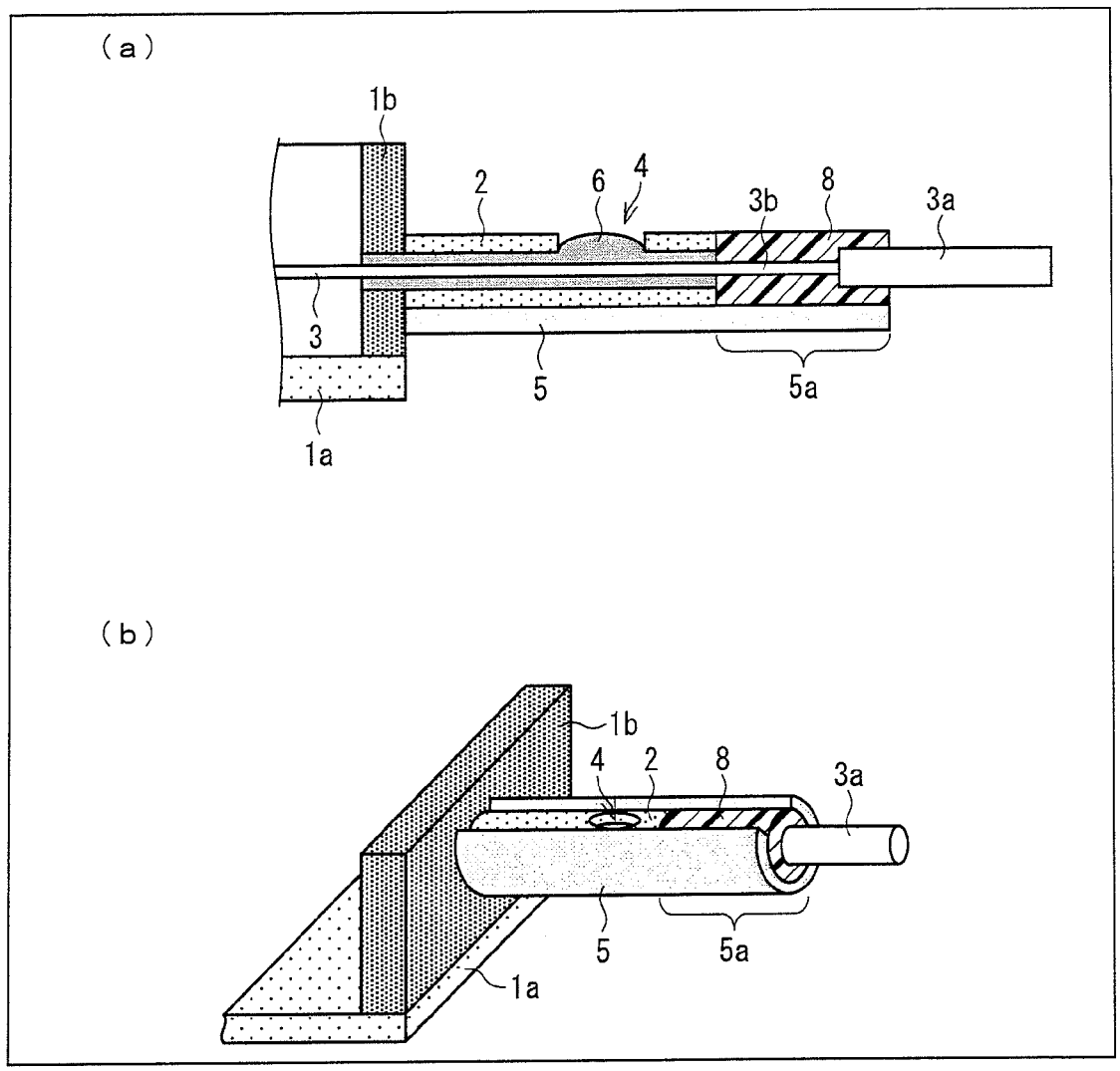
FIG. 6 is a cross sectional view and a perspective view showing still another variation of the heat conductor member subjected to the sealing step shown in FIG. 1.

The heat conductor member 5 for use in the method of the present invention is not limited to the shape early described. The following description discusses variations of the shape of the heat conductor member 5. FIG. 4 is a cross sectional view showing a variation of the shape of the heat conductor member 5. FIG. 5 is a cross sectional view showing another variation of the shape of the heat conductor member 5. FIG. 6 is a cross sectional view and a perspective view showing still another variation of the shape of the heat conductor member 5.

The heat conductor member 5 should be in contact with at least a part of the side surface of the optical fiber insertion pipe 2. As shown in FIG. 4, the heat conductor member 5 may (i) have a tube-like shape which has an opening corresponding to the feed hole 4, and (ii) be in contact with the entire side surface of the optical fiber insertion pipe 2 except a region where the feed hole 4 is provided. This makes it possible in the heating step to further uniformize the temperature distribution over the optical fiber insertion pipe 2.

As shown in FIG. 5, the heat conductor member 5 may have a tube-like shape in which the side surface of the heat conductor member 5 has a slit extending in a lengthwise direction of the heat conductor member 5. Use of the heat conductor member 5 having such a shape brings about an effect described as follows. The heat conductor member 5 is in contact with the side surface of the optical fiber insertion pipe 2 and can be fixed to it as such by a spring characteristic of the heat conductor member 5. The slit of the side surface of the heat conductor member 5 may be arranged so as not to overlap the feed hole 4.

(a) and (b) of FIG. 6 shows still another variation of the shape of the heat conductor member 5. (a) of FIG. 6 is the cross sectional view showing the heat conductor member 5 and a region around it. (b) of FIG. 6 is a perspective view showing the heat conductor member 5 and the region around it.

As shown in (a) and (b) of FIG. 6, in the present variation, the heat conductor member 5 has a protrusion part 5a that protrudes from the optical fiber insertion pipe 2 along a direction in which the optical fiber 3 extends (i.e., a direction opposite to a direction on which side the housing 1 is provided). The protrusion part 5a serves as a base on which a resin for sealing an exposed part 3b of the optical fiber 3 is provided in a resin providing step (which is later described).

That end part of the optical fiber 3 which extends farther from the optical module 10 is coated with a fiber coating 3a. On the other hand, (i) a quartz part of that part of the optical fiber 3 which extends inside the housing 1 and (ii) a quartz part of that part of the optical fiber 3 which extends inside the optical fiber insertion pipe 2 are exposed. As shown in (a) of FIG. 6, that part of the optical fiber insertion pipe 2, which extends outside the optical fiber insertion pipe 2 and is coated with no fiber coating 3a, is an exposed part 3b. A quartz part of the exposed part 3b is exposed.

In the present variation, the sealing step further includes the resin providing step in which a resin 8 is provided so as to seal the exposed part 3b of the optical fiber 3. This allows protection of the exposed part 3b of the optical fiber 3. By using, as the resin 8, a resin whose refractive index is smaller than that (of a clad layer) of the optical fiber 3, it is possible to prevent light leakage from the optical fiber 3.

In the resin providing step, the resin 8 is provided so that the exposed part 3b of the optical fiber 3 is sealed on the protrusion part 5a of the heat conductor member 5. As shown in (a) and (b) of FIG. 6, the protrusion part 5a of the heat conductor member 5 extends from the optical fiber insertion pipe 2, and the resin 8 is provided on the protrusion part 5a of the heat conductor member 5. This allows suitable sealing of the exposed part 3b of the optical fiber 3. Providing of the resin 8 is carried out by, for example, applying the resin 8, which is not hardened yet, on the protrusion par 5a of the heat conductor member 5.

It is preferable that the heat conductor member 5 has a tube-like shape whose cross section has a "C"-like shape (see (b) of FIG. 6). However, the heart conductor member 5 is not limited to this, but may have a tube-like shape whose side surface has a slit extending in a lengthwise direction (see FIG. 5). By employing the heat conductor member 5 having any of such shapes, it is possible to carry out suitable providing of the resin 8 and suitable maintaining of the resin 8 thus provided.

In each of the variations shown in respective FIGS. 4 through 6, the heat conductor member 5 is provided along and in contact with the outer edge part of the feed hole 4. As described above, this makes it possible in the feeding step to prevent the solder 6 from being leaked outside from the feed hole 4, thereby making it possible to selectively fill the inside of the optical fiber insertion pipe 2 with the solder 6.

SUMMARY

As described so far, in order to attain the object, the method of the present invention for manufacturing the optical module is a method for manufacturing an optical module including an optical fiber and an optical fiber insertion pipe into which the optical fiber is inserted, the method including a sealing step in which the optical fiber insertion pipe is hermetically sealed, the sealing step including: a contact step in which a heat conductor member is provided along and in contact with a side surface of the optical fiber insertion pipe, the heat conductor member having a heat conductivity greater than that of an environmental atmosphere of the sealing step and having a heat generating property of generating heat by induction heating, which heat generating property of the heat conductor member is inferior to that of the optical fiber insertion pipe in terms of heat generation amount; a heating step in which the optical fiber insertion pipe, to which the heat conductor member is thus provided in the contact step, is heated by induction heating, and a feeding step in which a solder is fed to a feed hole provided in the optical fiber insertion pipe.

In the heating step, the optical fiber insertion pipe is heated to a solder melting temperature by induction heating. As such, the solder fed to the feed hole is melted by a heat conducting from the optical fiber insertion pipe, and is then fed to the inside of the optical fiber insertion pipe via the feed hole. After this, while it is kept being melted by the heat conducting from the optical fiber insertion pipe, the solder thus melted and fed to the inside of the optical fiber insertion pipe fills, by wetting, a space between an inner wall of the optical fiber insertion pipe and the optical fiber.

Here, in the contact step, the heat conductor member is provided along and in contact with the side surface of the optical fiber insertion pipe. This allows a suitable control of temperature distribution over the optical fiber insertion pipe. This allows suitable wet-spreading of the solder thus melted.

That is, when subjected to the induction heating, a temperature of the heat conductor member is lower than a temperature of the optical fiber insertion pipe. Also, the temperature distribution due to the induction heating is less biased in the heat conductor member. As such, the heat conductor member draws heat from a high temperature part of the optical fiber insertion pipe and transfers the heat to a low temperature part of the same in a region where the heat conductor member and the side surface of the optical fiber insertion pipe are in contact with each other. This can uniformizes a temperature of the region of the side surface of the optical fiber insertion pipe. As such, it is possible that the solder thus melted uniformly spreads by wetting inside the optical fiber insertion pipe in the region. This allows suitable hermetic sealing of the optical fiber insertion pipe.

The heat conductor member may be provided along and in contact with the outer edge part of the feed hole via which the solder is fed to the inside of the optical fiber insertion pipe from the outside. According to the configuration, in the outer edge part of the feed hole, a temperature of the outside of the optical fiber insertion pipe can be lower than a temperature of the inside of the optical fiber insertion pipe. This can prevent the solder from being leaked outside from the feed hole, thereby making it possible to selectively fill the inside of the optical fiber insertion pipe with the solder.

In the method of the present invention, temperature distribution over the optical fiber insertion pipe can be suitable. This can improve the workability of the hermetic sealing by solder filing. With the method of the present invention, it is therefore possible to efficiently manufacture the optical module.

According to the method of the present invention, it is preferable that the heat conductor member is made from (i) one or more metals selected from the group consisting of copper and aluminum, (ii) an alloy containing the one or more metals selected from the group consisting of copper and aluminum, or (iii) ceramics.

The heat conductor member, which has a heat conductivity greater than that of the environmental atmosphere of the sealing step and has a heat generating property of generating heat by the induction heating, which heat generating property of the heat conductor member is inferior to that of the optical fiber insertion pipe in terms of heat generation amount, can be suitably made from (i) one or more metals selected from the group consisting of copper and aluminum, (ii) an alloy containing the one or more metals selected from the group consisting of copper and aluminum, or (iii) ceramics.

According to the method of the present invention, it is preferable that a part, where the side surface of the optical fiber insertion pipe and the heat conductor member are in contact with each other, extends over an entire length of a lengthwise direction of the side surface of the optical fiber insertion pipe.

According to the method, the part where the side surface of the optical fiber insertion pipe and the heat conductor member are in contact with each other extends over the entire length of the lengthwise direction of the side surface of the optical fiber insertion pipe. As such, it is possible to uniformize the temperature of the entire optical fiber insertion pipe. This allows the solder thus melted to uniformly spread by wetting inside the optical fiber insertion pipe. As such, it is possible to carry out suitable hermetic sealing of the optical fiber insertion pipe.

Furthermore, the method of the present invention may be arranged so that the heat conductor member and that part of the optical fiber insertion pipe, which is an outer edge part of the feed hole, may be in contact with each other.

According to the method, a heat is drawn from the outer edge part of the feed hole by the heat conductor member. This decreases a temperature of the outside part of the optical fiber insertion pipe to be lower than a temperature of the inside part of the optical fiber insertion pipe. Therefore, a fluidity of the solder in the feed hole is decreased so that a fluidity of the solder is decreased as the solder is farther from the inside part of the optical fiber insertion pipe toward the outside part of the optical fiber insertion pipe. This can prevent the solder from being leaked outside from the feed hole, thereby making it possible to selectively fill the inside of the optical fiber insertion pipe with the solder.

Furthermore, the method of the present invention may be arranged so that: the optical module includes a housing whose bottom plate has a heat conductivity higher than that of the optical fiber insertion pipe; the optical fiber insertion pipe extends from a side surface of the housing; the optical fiber insertion pipe has the feed hole on a downward side; and the heat conductor member is provided on an upward side of the optical fiber insertion pipe in contact with the optical fiber insertion pipe.

In a case where (i) the optical module includes the housing whose bottom plate has the heat conductivity higher than that of the optical fiber insertion pipe and (ii) the optical fiber insertion pipe extends from the side surface of the housing, a heat is drawn, by the bottom plate of the housing, from the downward side of the optical fiber insertion pipe. In this case, the heat conductor member is on the upward side of the optical fiber insertion pipe in contact with the optical fiber insertion pipe. This allows heat drawing from the upward side of the optical fiber insertion pipe. This can decrease a difference between the temperature of the downward side of the optical fiber insertion pipe and the temperature of the upward side of the optical fiber insertion pipe. This allows the solder to further uniformly spread by wetting.

With the configuration described above, it is possible to prevent the solder from spreading heavily to the upward side of the optical fiber insertion pipe. This makes it possible to successfully carry out visual inspection to determine that the solder reaches that end part of the optical fiber insertion pipe which is closer to the housing. It is therefore possible to improve the workability of the hermetic sealing step.

Furthermore, the method of the present invention may be arranged so that: the heat conductor member has a protrusion part protruding from the optical fiber insertion pipe along a direction in which the optical fiber extends; and the method of the present invention further includes a resin providing step in which a resin for sealing the optical fiber is provided on the protrusion part of the heat conductor member.

In the resin providing step, the resin is provided so as to seal the optical fiber on the protrusion part. The protrusion part of the heat conductor member is provided so as to protrude from the optical fiber insertion pipe along the direction in which the optical fiber extends. Thus, by carrying out the resign providing step, it is possible to suitably protect, with the resin, that part of the optical fiber which is not inserted into the optical fiber insertion pipe.

By using, as the resin for sealing the optical fiber, a resin whose refractive index is smaller than that of the optical fiber, it is possible to prevent light leakage from the optical fiber in an exposed part.

An optical module of the present invention includes an optical fiber and an optical fiber insertion pipe into which the optical fiber is inserted, the optical fiber insertion pipe being hermetically sealed with a solder, and a heat conductor member being provided along and in contact with a side surface of the optical fiber insertion pipe, the heat conductor member having a heat conductivity greater than that of an environmental atmosphere of hermetic sealing of the optical fiber insertion pipe and having a heat generating property of generating heat by induction heating, which heat generating property of the heat conductor member is inferior to that of the optical fiber insertion pipe in terms of heat generation amount.

Because the heat conductor member is thus provided, it is possible that temperature distribution over the optical fiber insertion pipe is suitable while the hermetic sealing of the optical fiber insertion pipe with the solder is being carried out. Because this improves the workability of the hermetic sealing by the solder filling, it is possible to improve manufacturing of the optical module.

It is intended that the scope of the present invention also encompasses a method of hermetically sealing an optical fiber insertion pipe into which an optical fiber is inserted, the method including the contact step, the feeding step, and the heating step each of which is described above.

[Supplementary Note]

The present invention is not limited to the description of the embodiments above, but may be altered by a skilled person within the scope of the claims. An embodiment based on a proper combination of technical means as disclosed in different embodiments is encompassed in the technical scope of the present invention.

INDUSTRIAL APPLICABILITY

The present invention can be employed as, for example, a method for manufacturing an optical module for use in an optical communications system.

REFERENCE SIGNS LIST 1. housing
1a. bottom plate
1b. side surface
2. optical fiber insertion pipe
3. optical fiber
4. feed hole
5. heat conductor member
5a. protrusion section
6. solder
8. resin
10. optical module
12. light-emitting device

The invention claimed is:

1. A method for manufacturing an optical module including an optical fiber and an optical fiber insertion pipe into which an optical fiber is inserted, the method comprising:
a sealing step in which the optical fiber insertion pipe is hermetically sealed, the sealing step including:
a contact step in which a heat conductor member is provided along and in contact with an outside surface of the optical fiber insertion pipe, the heat conductor member having a heat conductivity greater than that of an environmental atmosphere of the sealing step and having a heat generating property of generating heat by induction heating, which heat generating property of the heat conductor member is inferior to that of the optical fiber insertion pipe in terms of heat generation amount;

a heating step in which the optical fiber insertion pipe, to which the heat conductor member is thus provided in the contact step, is heated by induction heating, and a feeding step in which a solder is fed to a feed hole provided in the optical fiber insertion pipe, wherein the solder is melted by heat from the optical fiber insertion pipe, spreads into the optical fiber insertion pipe and, upon solidifying, hermetically seals the optical fiber insertion pipe.

2. The method as set forth in claim 1, wherein the heat conductor member is made from (i) one or more metals selected from the group consisting of copper and aluminum, (ii) an alloy containing the one or more metals selected from the group consisting of copper and aluminum, or (iii) ceramics.

3. The method as set forth in claim 2, wherein a part where the outside surface of the optical fiber insertion pipe and the heat conductor member are in contact with each other extends over an entire length of a lengthwise direction of the outside surface of the optical fiber insertion pipe.

4. The method as set forth in claim 3, wherein the heat conductor member and a part of the optical fiber insertion pipe which is an outer edge part of the feed hole, are in contact with each other.

5. The method as set forth in claim 2, wherein the heat conductor member and a part of the optical fiber insertion pipe which is an outer edge part of the feed hole, are in contact with each other.

6. The method as set forth in claim 1, wherein a part where the outside surface of the optical fiber insertion pipe and the heat conductor member are in contact with each other extends over an entire length of a lengthwise direction of the outside surface of the optical fiber insertion pipe.

7. The method as set forth in claim 6, wherein the heat conductor member and a part of the optical fiber insertion pipe which is an outer edge part of the feed hole, are in contact with each other.

8. The method as set forth in claim 1, wherein the heat conductor member and a part of the optical fiber insertion pipe; which is an outer edge part of the feed hole, are in contact with each other.

9. The method of claim 8, wherein:
the heat conductor member is configured to draw heat from the top of the feed hole such as to decrease a temperature at the top of the feed hole with respect to the temperature at the bottom of the feed hole; and
the temperature distribution over the feed hole is such that the solder on the bottom melts and spreads into the pipe whereas the solder on the top of the hole does not leak outside the hole.

10. The method as set forth in claim 1, wherein:
the optical module includes a housing whose bottom plate has a heat conductivity greater than that of the optical fiber insertion pipe;
the optical fiber insertion pipe extends from a side surface of the housing;
the optical fiber insertion pipe has the feed hole on a downward side; and
the heat conductor member is provided, on an upward side of the outside surface of the optical fiber insertion pipe, along and in contact with the optical fiber insertion pipe.

11. The method as set forth in claim 1, wherein:
the heat conductor member has a protrusion part protruding from an end of the optical fiber insertion pipe along a direction in which the optical fiber extends; and
the method further comprises a resin providing step in which a resin for sealing the optical fiber is provided on the protrusion part of the heat conductor member.

12. The method of claim 1, wherein:
the part of the optical fiber which is inside the insertion pipe is exposed; and
the solder directly contacts the exposed optical fiber.

13. The method of claim 1, wherein:
during the heating step the optical fiber insertion pipe is heated to a higher temperature than the heat conductor member; and
the heat conductor member is configured to adjust the temperature distribution over the optical fiber insertion pipe such that proper sealing is performed.

14. The method of claim 1, further comprising:
upon completion of the sealing step, removing the heat conductor member from contact with the optical module.

15. The method of claim 1, wherein the sealing step is performed by one or more of (i) an inactive gas atmosphere, (ii) a reductive atmosphere, or (iii) a gas atmosphere of a mixture of an inactive gas and hydrogen.

16. The method of claim 1, wherein the solder is melted by heat conducting from the optical fiber insertion pipe.

17. An optical module, comprising:
an optical fiber insertion pipe into which an optical fiber is inserted, the optical fiber insertion pipe being hermetically sealed by a solder, and
a heat conductor member provided along and in contact with an outside surface of the optical fiber insertion pipe, the heat conductor member having a heat conductivity greater than that of an environmental atmosphere of hermetic sealing of the optical fiber insertion pipe and having a heat generating property of generating heat by induction heating, which heat generating property of the heat conductor member is inferior to that of the optical fiber insertion pipe in terms of heat generation amount.

18. A method for hermetically sealing an optical fiber insertion pipe into which an optical fiber is inserted, comprising:
a contact step in which a heat conductor member is provided along and in contact with an outside surface of the optical fiber insertion pipe, the heat conductor member having a heat conductivity greater than that of an environmental atmosphere of hermetic sealing of the optical fiber insertion pipe and having a heat generating property of generating heat by induction heating, which heat generating property of the heat conductor member is inferior to that of the optical fiber insertion pipe in terms of heat generation amount;
a heating step in which the optical fiber insertion pipe, to which the heat conductor member is thus provided in the contact step, is heated by induction heating; and
a feeding step in which a solder is provided to a feed hole provided in the optical fiber insertion pipe, wherein the solder is melted by heat from the optical fiber insertion pipe, spreads into the optical fiber insertion pipe and, upon solidifying, hermetically seals the optical fiber insertion pipe.

* * * * *